US006957360B2

(12) United States Patent
Sims, III et al.

(10) Patent No.: US 6,957,360 B2
(45) Date of Patent: *Oct. 18, 2005

(54) SYSTEMS AND METHODS TO PERFORM DEFECT MANAGEMENT TO BLOCK ADDRESSABLE STORAGE MEDIA (75) Inventors: J. Robert Sims, III, Fort Collins, CO (US); Kyle Way, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/389,325

(22) Filed: Mar. 14, 2003

(65) Prior Publication Data

US 2004/0078648 A1 Apr. 22, 2004

Related U.S. Application Data

(63) Continuation of application No. 09/753,372, filed on Jan. 2, 2001, and a continuation of application No. 09/089,112, filed on Jun. 2, 1998, now Pat. No. 6,212,647.

(51) Int. Cl.[7] ............................................. G06F 12/10
(52) U.S. Cl. ............................. 714/8; 711/3; 711/112; 711/206
(58) Field of Search ........................... 711/4, 103, 111, 711/112, 202, 206; 714/6, 7, 8, 702, 710

(56) References Cited

U.S. PATENT DOCUMENTS

| 5,271,018 A | 12/1993 | Chan |
| 5,568,606 A | 10/1996 | Dobbek |
| 5,812,755 A | 9/1998 | Kool et al. |
| 5,835,930 A | 11/1998 | Dobbek |
| 5,844,911 A * | 12/1998 | Schadegg et al. ............ 714/710 |
| 5,848,438 A | 12/1998 | Nemazie et al. |
| 5,983,309 A | 11/1999 | Atsatt et al. |
| 6,212,647 B1 | 4/2001 | Sims, III et al. |
| 6,526,476 B2 * | 2/2003 | Wilson et al. ............... 711/112 |

* cited by examiner

*Primary Examiner*—Gary Portka (57) ABSTRACT

The present invention discloses a method and system for providing defect management of a bulk data storage media wherein logical addresses of media data blocks are continuously slipped to omit all media data blocks determined to be defective at the time of an initial media format. Thereafter, selectable parameters are utilized to define a logical zone including both a user data area and corresponding replacement data area on the media such that proper selection of the parameters provides defect management optimized for a particular use of the media.

33 Claims, 4 Drawing Sheets

SYSTEMS AND METHODS TO PERFORM DEFECT MANAGEMENT TO BLOCK ADDRESSABLE STORAGE MEDIA

This is a continuation of application Ser. No. 09/753,372, filed Jan. 2, 2001, and a continuation of application Ser. No. 09/089,112, filed Jun. 2, 1998, now U.S. Pat. No. 6,212,647.

TECHNICAL FIELD OF THE INVENTION

The present invention relates to the storage of information on a bulk storage media and, more particularly, to a system and method for providing media defect management with non-iterative deterministic conversion of logical address information to physical address information.

BACKGROUND OF THE INVENTION

Bulk storage media, such as magnetic and optical storage media, often include defects, such as inconsistencies in a magnetic or optical coating or other surface anomalies, which make portions of the media unsuitable for data storage. However, it is often desirable to use media containing such defects, as these defective areas are generally relatively small compared to the total storage area of the media. Moreover, such defects may develop or be detected during normal use of the storage media. Therefore, schemes for identifying and avoiding these defective areas have been used.

Traditional schemes for defect management have been complex and inflexible. These schemes have relied on utilizing a portion of the media as a defect management area in order to present a media that, although including defective areas, appears as if it were defect free. Accordingly, upon a manufacturer's formatting of the media for subsequent use in data storage, an analysis of the storage areas is made and defective areas are marked as unusable. In order to provide media which includes a particular amount of available user storage area, logical addresses of the user data areas are "slipped" into the defect management area so as to omit the physical address of these defective areas and, thus, present a defect free logical media.

However, as defects may develop or be discovered during actual use of the bulk storage media, there must also be a method of providing redirection for or replacement of defective areas discovered during use to available sparing areas. Accordingly, the systems operate to remap or redirect the logical address associated with an area determined defective to the logical address of a sparing area. Therefore, the manufacturer's initial formatting of the media includes establishing predefined user data areas and corresponding predefined sparing areas (defect redirection or remapping areas).

For example, with magneto-optical (MO) discs, the MO drive has to recognize the particular media and, thus, use predetermined data areas (user data areas) and predetermined sparing areas (defect redirection or remapping areas). Such sparing areas may be interspersed with the user data areas throughout the media at various intervals, thus establishing zones within the media wherein an amount of user data area and its corresponding sparing area are established. Therefore, defect management tables are provided to allow the drive to properly read and write user data within these zones without encountering a defective area. However, it should be appreciated that these prior art defect management tables store only a list of used sparing areas and, thus, require complex operations in order to determine sparing areas available for remapping.

On most media, regardless of the physical position of the tracks defined for data storage, the information density of these tracks remains constant. However, as tracks are established further out toward a circumferential edge of a media disc, the tracks themselves become larger. Therefore, there are more sectors per track available on tracks disposed radially toward the circumferential edge as compared to tracks disposed more radially inward. However, prior art systems tend to keep the zones a fixed radial width, i.e., each zone includes substantially the same number of tracks, which means that zones disposed further out toward the circumferential edge include more sectors than the ones further in because of the longer tracks included in the zones further out in diameter on the media surface.

For example, as the tracks become longer due to their concentric disposition on the media, a track eventually becomes large enough to allow an additional sector to be fit in (the generally adopted data formats of bulk storage media do not provide for partial sectors). Therefore, as the tracks become longer as they are established further out toward the circumferential edge, tracks are defined having increased space not quite sufficient to provide an additional sector. However, provided enough tracks are defined on the media, a track is established having sufficient length to provide a complete extra sector. This is a natural division point on the media for any kind of operation, such as the above described zone boundaries. Therefore, zones defined by this phenomena of the media, although having a constant information density, will provide differing amounts of data storage.

The prior art systems generally set aside more blocks for defect management (sparing blocks comprised of sparing sectors) within the zones disposed more toward the circumferential edge, such that a substantially constant ratio of defect management blocks to user data blocks are set aside for sparing. Thus, the intervals at which the sparing areas are spaced do not present a simple mathematical relationship and, accordingly, are not easily accessed without a defect management table including sufficient information to provide logical addressing for the irregular sparing intervals.

Furthermore, as the zones associated with the user data areas and the sparing areas are defined by the physical attributes of the media, the sparing portion of a zone may not always present a desired amount of sparing blocks nor a desired distribution upon the media. A prior art zone will include a particular number of total sectors due to its relationship to the physical attributes of the media. Accordingly, using an example of 1100 total sectors in a particular zone, if it is desired to provide 1000 sectors as free user data storage and 100 sectors of sparing, this may not be possible. If there are defective sectors within the 1000 sectors upon the manufacturer's formatting of the media, this deficiency in the user data storage space will be compensated for by slipping these defective sectors to the sparing sector. Thus, the sparing sectors will initially be short sectors from the desired total. Accordingly, there will not be the desired amount of sparing area available for sparing during actual use of the media.

Moreover, it should be appreciated that slipping of the defective storage areas into the sparing area is done in the prior art for each zone, i.e., user storage area and corresponding sparing area combination. Accordingly, the slipping mismatch resets itself at every zone. As slipping starts from the beginning of the zone, an actual implementation must determine for any operation, i.e., for a random sector read or write request, the system must determine how many sectors are listed in the defect list prior to that one but in that zone. Therefore the system must know the physical start address of the zone, and how many defects are listed between that address and the requested sector. Determining this information involves at least two lookups in the defect table.

Additionally, with prior art systems relying on physical phenomena in order to define zones, and therefore define sparing sector intervals, sparing is tied to the physical attributes of the media. However, a particular sparing scheme defined by the media's physical attributes may not be optimized for the particular environment in which the storage media is going to be used. For example, use of the media in environments which require streamed data, such as recording video or audio, may not benefit optimally from sparing intervals established as a function of the physical phenomena of the media.

Furthermore, the amount of space set aside for defect management cannot be changed in these prior art schemes, as the defect management techniques have written into the media standard itself the location for the sectors that are used for defect management. For example, a mass storage unit incorporating prior art defect management techniques will generally come from the manufacturer with certain areas set aside for defect management and the allocation of these areas could not be altered.

Therefore, a need exists in the art for a system and method for managing defects on bulk storage media which is simplified in its implementation.

A further need exists in the art for a defect management technique which is independent of physical characteristics of the bulk media.

A still further need in the art exists for the defect management technique to be configurable for the particular environment in which it is to be used.

SUMMARY OF THE INVENTION

These and other objects, features and technical advantages are achieved by a system and method which provides defect management by slipping defects known at format across the entire media and redirecting areas determined to be defective thereafter to sparing areas which are established according to selectable parameters. Accordingly, simple mathematical relationships may be utilized in determining the physical address of any desired logical address. Moreover, due to consistent application of the defect management technique across the media, defect management tables only need be referenced a single time in the physical address determination.

According to the present invention, two defect management lists or tables are maintained, although multiple copies of each will be typically stored. The first table, the primary defect list, includes defects known at format time. Items in this table are simply dropped out of the logical space of the drive for read and write operations. This is preferably done only at format time, as changing this table potentially affects the logical address of every sector on the media.

Although initially appearing similar to traditional implementations, the primary defect list of the present invention is improved in that only one search of the table, i.e., a very fast binary search, is required in determining a physical address from a logical address because of the uniform slipping of defective areas. Accordingly, to determine a physical address, all that is required is searching the primary defect list for the last entry having an address less than the current area of interest and adding the number of slipped addresses associated therewith to the logical address of the area of interest to determine its physical address.

Preferably, entries in the primary defect list are tagged as to their origin, such as manufacture, user certification, or user specified, and are sorted by location. Blocks are skipped by the index into the table where the entry is larger than the requested block, and that index is added to the requested block.

The second table, or secondary defect list, includes defects found during use. Defective blocks are marked as such, and space set aside at format time for sparing is used instead. This list provides the map of defective areas to their new, spared, location. However, it shall be appreciated that slipping as described above with respect to the primary defect list not only prevents primary defects from being slipped into the spare areas, but also allows for the spares areas themselves to be slipped. Specifically, if one of the areas that would have been allocated as a spare is defective, the spare area effectively grows such that there is the total amount of space available for sparing within each flexible zone. Accordingly, slipping across the entire media not only provides the improved initial search described above with respect to the primary defect list, but also allows for realization of an amount of sparing area desired without this area being reduced by manufacturer defects.

Preferably the secondary defect list contains all space available for sparing, whether or not it has been used for sparing, as this reduces the algorithm necessary for finding available sparing space to merely searching a list. Accordingly, the supplementary defect list of the preferred embodiment of the present invention never changes in size during running. Such a list is initially larger, i.e., includes more sparing entries, than in previous algorithms, where a table is appended each time a remapping of a defective area to a sparing area occurs. However, it should be appreciated that this list is constant in size. Moreover, although the secondary defect list of this preferred embodiment of the present invention initially contains more entries, no additional data storage space is required as the prior art systems must necessarily include sufficient storage space reserved for full entry of all defect mapping available. As such, the present invention greatly simplifies runtime algorithms, such as for determining space available for sparing, without effectively requiring any additional memory resources.

In a preferred embodiment, the secondary defect list is sorted, allowing very fast searches. For example, using a sorted list requires only a single search for either finding a replaced sector or verifying that a sector has not been replaced. Likewise, a single search is required to find a space for replacement. Accordingly, when a defect on the media is found during use, the system need only look to the next available, or nearest available, entry in the secondary defect list and move the information to that location.

In contrast, previous algorithms required generating an allocation map for available space and subtracting what had been used according to the list. Accordingly, these traditional schemes have required additional memory or time in order to determine sparing space available for remapping of a defective areas. For example, old systems can generally determine what was set aside for sparing and what has been used and, therefore, can build a map in memory of what is available for use when remapping is necessary. However, this scheme is more complex than that of the present invention and actually occupies more memory and/or takes more time. Specifically, it is either necessary to have this free sparing area table generated up front, in addition to the secondary defect list providing the remapping of particular defective areas, to provide information with respect to available sparing areas when needed, or it must be generated each time remapping is called for, i.e., on the fly, which takes time and can degrade system performance.

Additionally, the prior art defect management schemes allow chaining i.e., if block A is defective and remapped to B, if B is later found to be defective, B will be further remapped to C. Therefore, prior art algorithms in accessing block A have to look to a table to determine A has been remapped from A to B. Then the prior art algorithms must check the table again to make sure that B was not in turn remapped, such as to C. This presents the possibility of a very long chain search.

However, a preferred embodiment of the present invention provides entries in the secondary defect list to indicate a subsequent remapping. Accordingly, if block B, providing remapping for block A to block B, is subsequently determined to be defective, the entry from A to B is marked as no longer valid. Thereafter, another entry is generated and A is now mapped directly to C. This scheme penalizes the write sequence slightly in that it is necessary to first mark the block defective and then directly remap A to C. However, this slight increase in overhead associated with a write operation for a remapped block determined to be defective is more than compensated for in the decreased overhead for the remapped block in all subsequent accesses.

Space for sparing is set aside in the format specification in prior art defect management schemes, i.e., the space for logical sectors will fall naturally and is used to define the space for defect management and/or is specified by the media standard. Accordingly, this information cannot be changed after design time. However, the present invention does not define special areas for sparing. Instead, two parameters that describe the spare areas are utilized: the spare interval (SI) and the spare length (SL).

According to the present invention, there are SL spare blocks per SI user data blocks. This allows the defect management to be distributed (small SI and SL), blocked (large SI and SL), etcetera. Accordingly, the present invention provides for flexible or logical zones as defined by the selectable parameters SI and SL.

Different applications or environments have different needs with respect to defect management. For example, defect management may optimally be configured for streaming storage as opposed to reliable storage or data rate on good media as opposed to data rate on poor quality media. In operation of the present invention, allocation of spare areas can be adjusted to accommodate these different needs at format time by selecting the parameters SI and SL accordingly.

Below are shown examples of particular attributes for selection of the parameters SI and SL to provide defect management useful in various environments:

Choosing SI and SL such that SI+SL~(media size) results in a configuration where all spare space is set aside at an end of the media;

Choosing SI and SL such that 2*SI+SL~(media size) results in a configuration where all spare space is set aside at approximately the middle of the media;

Choosing SI and SL such that 2*(SI+SL)~(media size) results in a configuration where two spare areas are set aside, one each at approximately the middle of the media and the other at an end of the media; and Choosing SI and SL such that (media size)/(SI+SL) is large results a distributed sparing configuration that provides for streaming performance at a rate of SI/(SI+SL) of the non-spared rate, but has no substantial "gaps" in the user data areas SI. In contrast, the second of the above examples has such a gap since, when the end of the first user data area SI is reached, the drive must seek to SI+SL, skipping the SL area, to access the second user data area SI.

According to the present invention, applying a replacement space formula followed by a slipping space formula provides non-iterative, deterministic conversion of a logical block address (the error-free space) to a physical address (which contains spare areas, defects, and replacements). Moreover, just by changing the parameters, the present scheme can either behave in a manner similar to a more traditional scheme, where large chunks of data are followed by large chunks of data set aside for sparing, or a model that is distributed where, although providing the same relative percentage of sectors available, a short stretch of user data is followed by space assigned for sparing, for example.

Selection of the parameters to define the flexible zones of the present invention may be at any point up to user format time. Accordingly, a user may choose values for SI and SL which provide defect management optimized for the particular environment into which the media is to be deployed. Alternatively, a user may indicate an amount of space to set aside for sparing and indicate a particular sparing scheme, such as distributed or blocked, or indicate an environment or use of the media and allow an algorithm to select the parameters SI and SL optimized for the use.

It should be appreciated that there is no requirement that n*(SI+SL) exactly match the media size and, therefore, the present invention supports such cases without requiring special handling.

Likewise, it should be appreciated that the present invention results in a simplified technique for defect management through the use of defect lists provided to allow conversion of logical addresses to physical addresses rapidly, such as through entries established for all spare addresses as well as their attendant categorization and sorting and simple mathematical relationships between these addresses provided by slipping the entire media and the use of configurable parameters to define user and sparing storage areas. However, it should also be appreciated that in the preferred embodiment of the present invention, as many factors may be traded off between reading and writing, it is preferred to make it easier to read than to write in order to maintain compatibility with read only drives, such as DVD or CD ROM media formats. Accordingly, requiring that the tables be sorted as discussed above, although increasing overhead during a write operation when a sector is remapped, is preferably performed in order to make subsequent reads easier.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
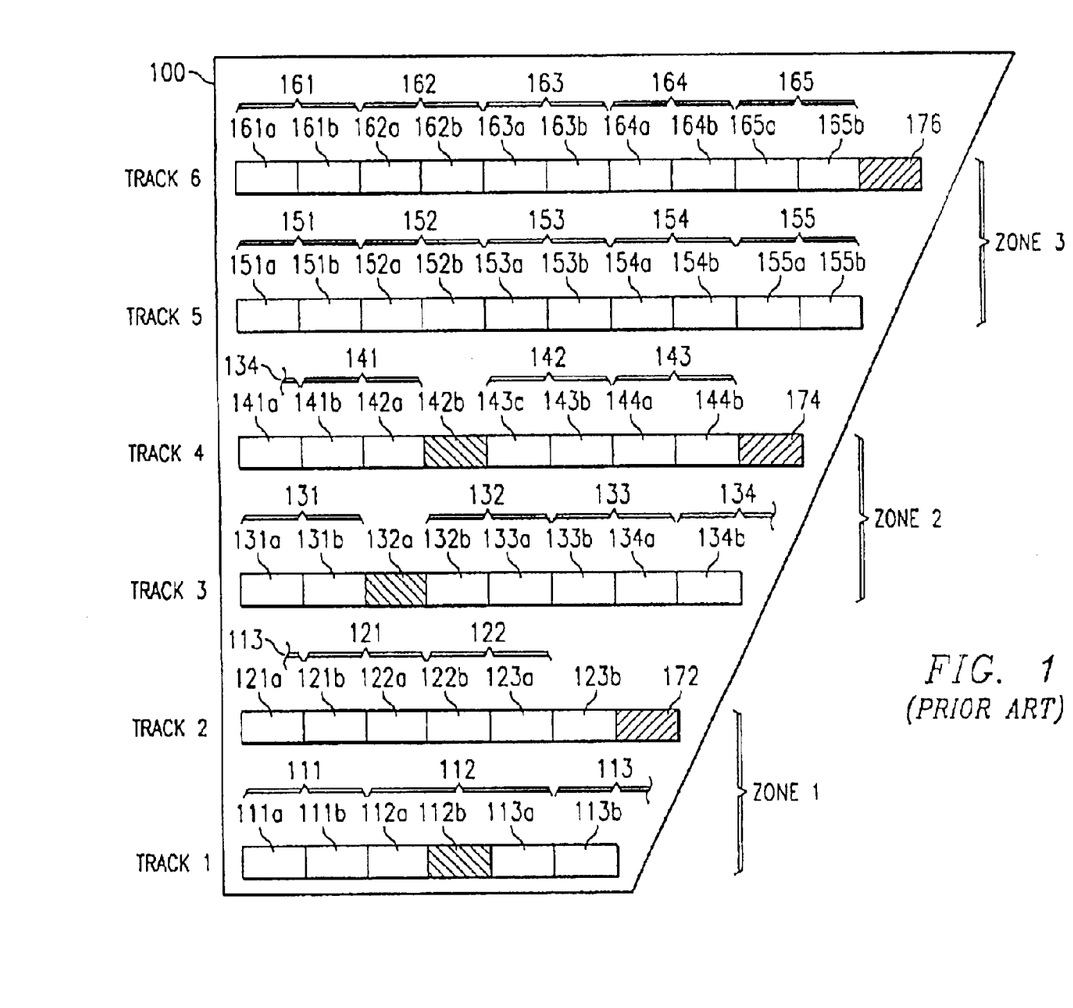
FIG. 1 illustrates defect management according to the prior art.

In understanding the present invention it is helpful to review traditional schemes for providing defect management. Accordingly, with reference to FIG. 1, defect management according to the prior art will be briefly discussed. Shown in FIG. 1 is bulk media 100 having tracks 1 through 6 defined thereon. It shall be appreciated that the tracks of media 100 are progressively increased in length. This is due to the media of this example is representative of a disc surface where the tracks are concentric rings which, as they are disposed more near the circumferential edge of the disc, are larger.

The tracks of media 100 have sectors defined therein, i.e., sectors 111a–113b for track 1, sectors 121a–123b for track 2, sectors 131a–134b for track 3, sectors 141a–144b for track 4, sectors 151a–155b for track 5, and sectors 161a–165b for track 6.

It shall be appreciated that in progressing from track 1 to track 6, there are areas within ones of the tracks, here tracks 2, 4, and 6, where there is insufficient space in which to define a complete sector. These areas are shown as areas 172, 174, and 176, respectively. As the system utilizes the media in units of sectors, the areas which are insufficient for defining a complete sector remain unused for information storage, although presenting natural boundaries for defining zones. Accordingly, shown in FIG. 1 are zone 1, including tracks 1 and 2, zone 2, including tracks 3 and 4, and zone 3, including tracks 5 and 6, which are defined by the points at which a track includes sufficient additional space to provide a complete additional sector over that of a next track.

As illustrated in FIG. 1., certain of the sectors are defective. Accordingly, when determined to be defective upon manufacturer's format, primary or low level format, sectors 112b, 132a, and 142b are omitted from the available logical addresses and are, thus, slipped to non-defective sectors.

Media 100 is addressable in sectors but is recorded in units of blocks which include multiple ones of the addressable sectors (here 2 sectors per block). Accordingly, the zones of this prior art system are broken down into blocks consisting of multiple sectors, such as during a user format, secondary or high level format. Specifically, zone 1 includes blocks 111–113 (track 1) and blocks 121 and 122 (track 2), zone 2 includes blocks 131–134 (track 3) and blocks 141–143 (track 4), and zone 3 includes blocks 151–155 (track 5) and blocks 161–165 (track 6). The blocks of media 100 are shown in FIG. 1 as having two sectors per block for simplicity. Block 112 is defined to cover an area of the media larger than two sectors, although only including two usable sectors, as the primary format has omitted the defective sector from the logical addresses available for use and the secondary format utilizes this information in defining the blocks.

It shall be appreciated that, relying on the natural phenomena of the media to define zone boundaries, the blocks of zone 1 are unable to utilize sector 123b as there is insufficient space within zone 1 as defined by the phenomena of the media to provide a complete block.

Relying on the natural phenomena of the zone boundaries necessarily limits the total number of sectors, and therefore blocks, available for use in a zone. This may become problematic when slipping logical block addresses for a primary defect list.

The prior art systems provide for defect management by allotting a number of the sectors within a zone for user data and any unused remaining sectors for sparing. For example, zone 2 of FIG. 1 may have the first twelve sectors allotted for user data area and, thus, the expected remaining four sectors for sparing. However, zone 2 is shown having defective sectors 132a and 142b. If these defects are detected during a primary format of the media, the physical address for these two sectors would be omitted in the logical address table for the media. Accordingly, although sector 132a is the third physical sector of zone 2, sector 132b would be logically identified as the third sector (the logical address is slipped one address space to omit the defective sector). Likewise, although sector 142b is the twelfth physical sector of zone 2, sector 143a would be logically identified as the eleventh sector (the logical address is slipped two address spaces to omit the two proceeding defective sectors). As the total number of sectors and blocks is defined by the physical phenomena of the zone, this slipping will cause sectors 143a and 143b to be utilized for user storage areas in order to provide the desired number of user blocks. Accordingly, the user sectors are slipped into the area of zone 2 which might otherwise be available for sparing. Therefore, after secondary formatting, the desired six user storage blocks are available although only a single sparing block is provided. Moreover, if there are so may defects found that slipping past the end of the spare area would occur, replacement is used instead, with the replacement sectors allocated from the spare area of another zone.

Additionally, as the zones of the media of FIG. 1 are determined by the physical phenomena, the physical address of the first block of zone 2 will be unaffected by the slipping due to defects in zone 1. Accordingly, the slipping of logical addresses will begin afresh for each zone. For example, defective sector 132a, the third physical sector of zone 2, will cause sector 132b to be logically addressed as the third sector of this zone irrespective of the slipping of sectors in zone 1 due to defective sector 112b. This requires a determination of the starting logical address of zone 2 and then a determination of the number of sectors slipped within that zone physically addressed prior to a block of interest before a determination can be made as to the logical address of a sector of interest.

Figure 2:
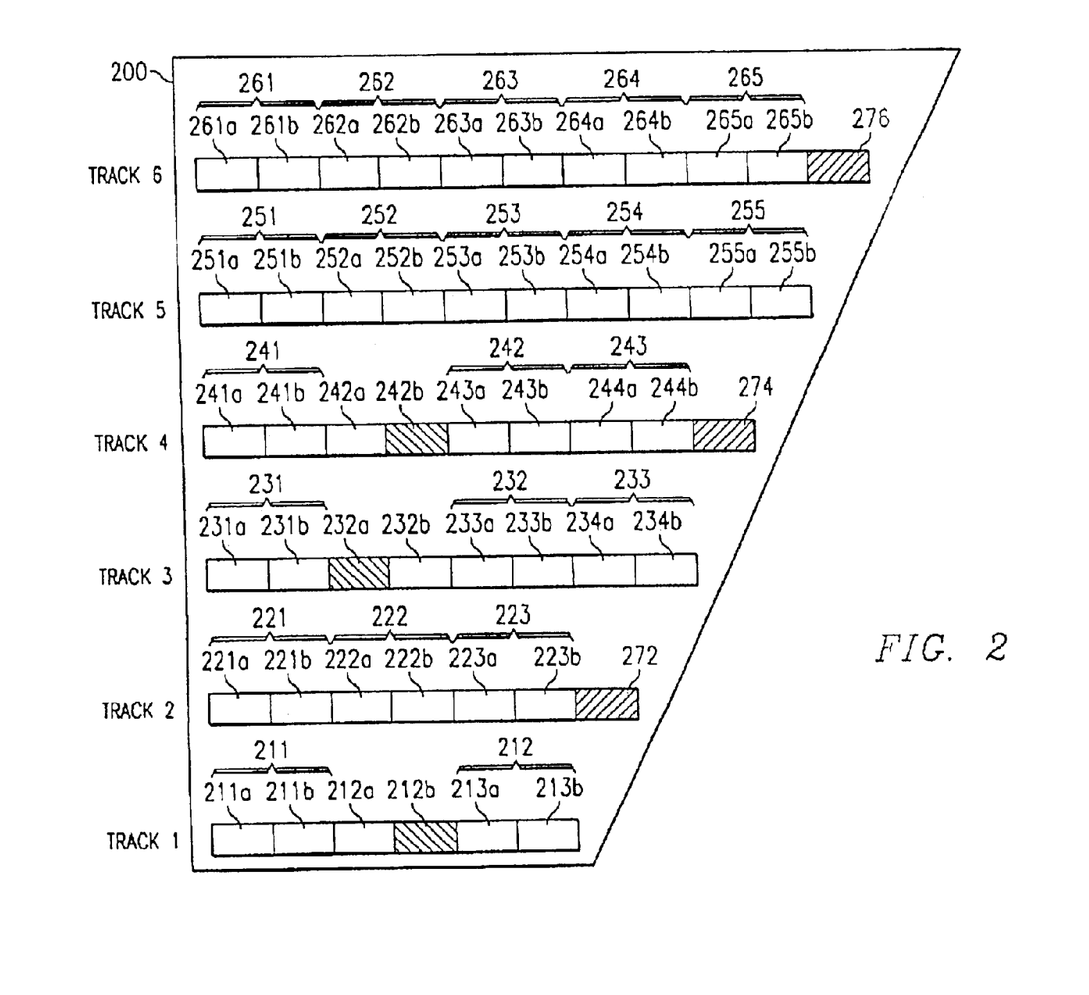
FIG. 2 illustrates defect management according to an embodiment of the present invention.

Directing attention to FIG. 2, media 200, initially the same as media 100 of FIG. 1, utilizing defect management according to the present invention is illustrated. Shown in FIG. 2 are tracks of increasing lengths, as in FIG. 1, having defined therein sectors, i.e., sectors 211a–213b for track 1, sectors 221a–223b for track 2, sectors 231a–234b for track 3, sectors 241a–244b for track 4, sectors 251a–255b for track 5, and sectors 261a–265b for track 6.

Sectors identified as defective during primary formatting are omitted from the logical address space of media 200 in order to avoid their use. Accordingly, the logical addresses are slipped to correspond to a physical address of a subsequent non-defective sector. However, the slipping of the logical address is preferably the same unit as the blocks to be utilized in order to simplify the algorithms used to determine physical addresses of blocks.

Information with respect to defective sectors determined at this time of format is preferably stored in a first list, such as a primary defect list (PDL). Preferably, entries in the primary defect list are tagged as to their origin, such as manufacture, user certification, or user specified, and are sorted by location.

It shall be appreciated that, according to the present invention, the whole medium is slipped, not just individual zones between allocated defect management areas. Accordingly, only one search of the PDL table is required to determine the physical address of a particular logical address.

As with the media of FIG. 1, in progressing from track 1 to track 6 on media 200, there are areas within ones of the tracks, here tracks 2, 4, and 6, where there is insufficient space in which to define a complete sector. These areas are shown as areas 272, 274, and 276, respectively. However, unlike the media of FIG. 1, the present invention does not rely on natural phenomena corresponding to these increases in track lengths in order to identify zones or otherwise define user and corresponding sparing areas.

Media 200 is further broken down into blocks consisting of multiple sectors, such as during a user format, secondary or high level format. Specifically, media 200 includes blocks 211–212 (track 1), blocks 221–223 (track 2), blocks 231–233 (track 3), blocks 241–243 (track 4), blocks 251–255 (track 5), and blocks 261–265 (track 6). However, as described above, the present invention preferably utilizes the same unit of slipping as of replacement. Accordingly, block 232 begins at sector 233a due to defective sector 232a, for example. Utilizing the same unit of slipping as of replacement both simplifies reading as well as simplifies writing when compared to prior art systems which allows slipping at the sector level and, therefore, the physical length of a particular block is indeterminate. Although discussed with reference to a primary and secondary format to more clearly describe the concepts involved, it shall be appreciated that the mapping of physical addresses to logical addresses as well as establishing the blocks of sectors may be accomplished in a single format process.

It shall be appreciated that the blocks of media 200 are not divided into physical zones as were those of media 100. Accordingly, a block of media 200 may span an area between two tracks even where the two tracks involve the additional sector phenomena defining a zone in the prior art.

It shall be appreciated that although blocks having only two sectors therein are shown for simplicity in illustrating the concepts discussed herein, the present invention is not so limited. For example, a preferred embodiment of the present invention is used with media addressable in 2K sectors which are recorded in units (blocks) of 32K (16 sectors per block). Furthermore, although discussed with reference to block addressable media, the present invention is equally adaptable to other media. For example, the concepts of the present invention are useful for providing defect management for media which is not blocked, i.e., where a block is defined as a single sector, as well as variable blocked media. Accordingly, the present invention may be adjusted to accommodate blocked, non-blocked, or variable block technology, i.e., technology which allows the block size to be defined at format time, but which is constant within a given medium.

As discussed above, the present invention does not rely on predefined zones to provide user areas and areas for sparing. Instead, parameters that describe logical zones are utilized and the existence of physical zones or tracks are ignored, making the assumption that there is a contiguous set of physical sectors, possibly grouped into blocks, available. This assumption holds even on media having zones, as the last sector of zone 3 has an address one smaller than the first sector in zone 4, for example. Therefore, the present invention defines equal sized logical zones from the sectors/blocks of the media. Accordingly, different applications having different needs, such as streaming or reliable storage, data rate on good media or data rate on poor quality media, etcetera, may be optimally accommodated by defect management according to the present invention. Allocation of spare areas can be allocated to accommodate these needs at format time when this invention is used.

Logical zones are described by two parameters, the spare interval (SI) and the spare length (SL), according to a preferred embodiment of the present invention. These parameters define a relationship for the media such that there are SL spare blocks per SI user data blocks and, therefore, a logical zone is the unit SI+SL. This allows the defect management to be distributed (small SI and SL) or blocked (large SI and SL).

The equal size logical zones of the present invention allow a straight forward formula to be used to determine zone addresses rather than more cumbersome lookup tables. Additionally, the use of logical zones allows the slipping to occur across the whole disc, including within the spare area. This further simplifies the implementation as well as provides a consistent size available for later replacement.

Furthermore, the use of a logical zone rather than following the underlying physical structure allows the same media to support a variety of applications. For example, a disc with 16 sectors of spare area followed by 256 sectors of user data provides a media with 6% available for sparing, and a continuous performance of 94% of the underlying media rate. The same disc, formatted with 65536 sectors of spare area and 1048576 sectors of user data still provides for 6% available sectors for sparing, but instead delivers 100% performance except for a delay approximately every million sectors.

Referring still to FIG. 2, illustrative examples of selection of SI and SL are provided below to demonstrate provision of defect management adapted for various uses. It shall be appreciated that media 200 of FIG. 2 provides 45 sectors after primary formatting (slipping logical addresses to omit defective sectors). These 45 sectors provide 21 blocks for use after secondary formatting (defining blocks from the available sectors). However, unlike the prior art system relying on the physical attributes of the media to define zones of user and corresponding sparing areas, the blocks of the present invention are available for use according to the needs of the particular environment into which media 200 is to be deployed.

Choosing SI=17 and SL=4 for media 200, or SI+SL~media size, all spare space is set aside at an end of media 200. Specifically, as the spare interval (SI) is seventeen blocks in length, the spare blocks fall at an end of media 200. Accordingly, blocks 211–212, 221–223, 231–233, 241–243, 251–255 and 261 may present a user area of seventeen blocks while blocks 262–265 provide sparing.

Choosing SI=8 and SL=4 for media 200, or 2*SI+SL~media size, all spare space is set aside at the middle of the media. Specifically, as the spare interval (SI) is eight blocks in length, the spare blocks fall between two spare intervals of eight blocks each and, thus, is disposed in the middle of media 200. Accordingly, blocks 211–213, 221–223 and 231–234 may present a first user area of eight blocks, blocks 241–243 and 251 present a sparing area of four blocks, and blocks 252–255, and 261–264 present a second user area of eight blocks.

Choosing SI=7 and SL=3 for media 200, or 2*(SI+SL)~media size, two spare areas are set aside, one each at the middle and an end of the media. Specifically, as the spare intervals are seven blocks in length, there are sufficient blocks to present two user areas with a spare interval there between with an additional spare interval at an end of the media. Accordingly, blocks 211–212, 221–223, 231 and 232 may present a first user area of seven blocks, blocks 233, 241, and 242 present a first sparing area of three blocks, blocks 243, 251–255, and 261 present a second user area of seven blocks, and blocks 262, 263, and 264 present a second sparing area of three blocks.

Choosing SI=2 and SL=1 for media 200, or (media size)/(SI+SL) to be large; results in distributed sparing that provides for streaming performance at a rate of SI/(SI+SL) of the non-spared rate, but has no "gaps." Accordingly, blocks 211 and 212 may present a first user area, block 221 present a first sparing area, blocks 222 and 223 present a second user area, block 231 present a second sparing area, etcetera.

In use, second list, the replacement list or secondary defect list (SDL), stores information with respect to defects found during use. Accordingly, defective blocks are marked as such, and the space set aside for sparing is used for replacement blocks. This list provides the map of defective areas to their new, spared, location.

According to the preferred embodiment of the present invention, the SDL contains all space available for sparing, whether or not it has been used for sparing. This reduces the algorithm for finding available sparing space to searching a list. Although the SDL of the present invention may be initially larger than in previous algorithms, it is constant in size. Moreover, only a single search is needed for either finding a replaced sector or verifying that a sector has not been replaced. Additionally, the replacement list is preferably sorted, thus allowing very fast searches.

It shall be appreciated that the concepts of the present invention as described above may be implemented on any number of processor based systems and their associated bulk storage media. Directing attention to FIG. 3, a preferred embodiment of a system, system 300, adapted according to the present invention is shown. Here system 300 includes processor based system 310 having input device 311, i.e., a keyboard, and output device 312, i.e., a video display. System 300 also includes bulk media drive unit 350 having media 200 disposed therein. Drive unit 350 includes head assembly 351 adapted to exchange information between media 200 and processor based system 310.

Figure 3:
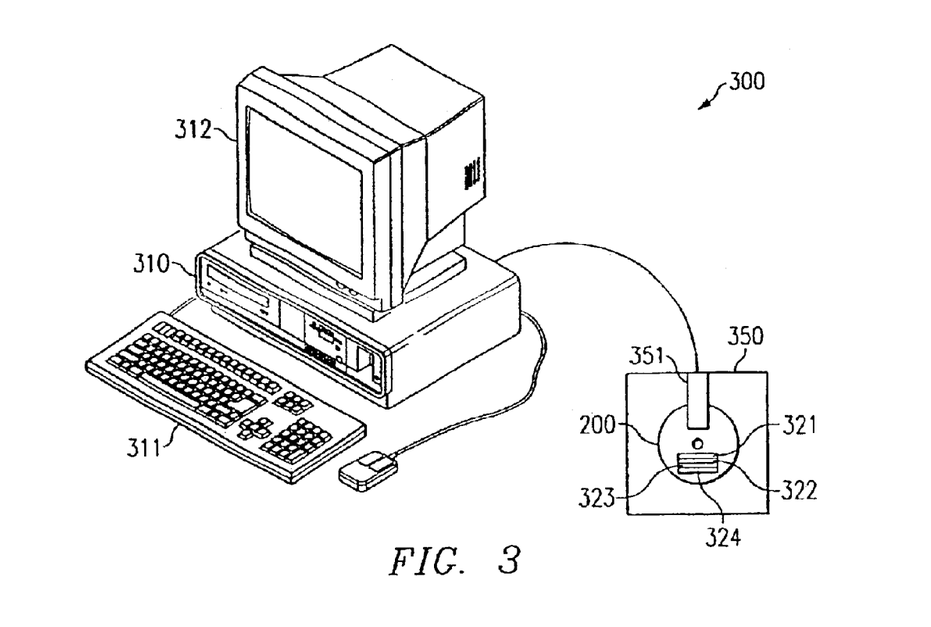
FIG. 3 illustrates a system adapted to provide defect management according to an embodiment of the present invention.

Of course, a processor based system adapted according to the present invention may assume forms other than that shown in FIG. 3. For example, drive unit 350 may include a processor in addition to, or in lieu of, the processor of processor based system 310.

Shown in block diagramatic form are the above described data areas of media 200. Specifically, media 200 includes primary defect list 321, secondary defect list 322, sparing area 323, and user data area 324. Of course, the data areas illustrated are not intended to represent the actual placement, relative size, or inter-relationship of these data areas.

Utilizing the above described PDL and SDL with the knowledge of the areas set aside for defect management from the information SI and SL, applying a replacement space formula, followed by a slipping space formula, allows non-iterative, deterministic conversion of a logical address (the error-free space) to a physical address (which contains spare areas, defects, and replacements). In order to provide further detail with respect to these concepts, use of logical zones and the primary defect and secondary defect lists of the present invention to provide defect management for sector slipped across the media according to the present invention will be discussed in detail below with reference to a preferred specific embodiment.

Implementation of the above inventive concepts will be described herein below with respect to a preferred embodiment media adapted to provide information capabilities according to an accepted standard, such as digital video disc (DVD). The preferred embodiment provides both read and write capability, referred to hereinafter as DVD+RW, as opposed to read only, such as DVD-ROM.

Preferably, DVD+RW media is divided into 3 zones: (1) lead-in; (2) data area; and (3) lead-out. These three areas are located on a continuous spiral path from the inner diameter to the outer diameter of the disc. The lead-in area contains information used by the logical unit to determine media characteristics and manage the logical layout. The lead-in is preferably formed partially with embossed pits as found on DVD-ROM media and partially written with the phase change effect.

The data area is divided into spare areas and user data areas according to the concepts of the present invention. The size of each is user configurable, allowing flexibility to accommodate both computer and streamed (video) data. The allocation of the data area to user data and spare areas is done only at format time, although this allocation may be altered again upon a subsequent format.

The defect management scheme of the present invention specifies a number of spare sectors (spare length SL) per number of user data sectors (spare interval SI), where SL and SI are user chosen values as described above.

Preferably, SL and SI are integral powers of two, i.e., $2^N$, with a value of 16 or higher. This constraint on selection of SL and SI allows implementations to use shifting, addition, and masking rather than division, multiplication, and modulo functions in order to yield a greater performance gain. For example, instead of multiplying a number by 16 ($2^4$), it can be shifted left 4 bits. Instead of dividing a number by 32 ($2^5$), it can be shifted right 5 bits. Instead of performing X mod (16), X can be logically bitwise ANDed with 0Fh. Finally, multiplying X by 48 (16+32) can be performed by (X<<4)+(X<<5), where << represent logical shift left.

Additionally, SL and SI are preferably chosen such that the total defect list size is less than or equal to 32,768 bytes (including the headers). However, any selection of values for SI and SL, i.e., arbitrary SI and SL, may be utilized according to the present invention, although there may be a performance tradeoff experienced due to more complicated algorithms for converting a logical address to a physical address.

In the preferred embodiment, SI is restricted to values $2^N$, where $N \geq 4$. However, SL is allowed to be zero in order to define no areas for sparing and is therefore restricted to values 0 or $2^M$, wherein $M \geq 4$. There is no explicit relationship of either SI or SL to the disc size.

It shall be appreciated that placing the spare area ahead of the user data area, allows for some practical implementations where the $2^N$ restriction is implemented with SI and SL. When these values get large, they cannot be controlled finely. However, because the spare area is smaller than the user data area, the numbers are also more fine. For example, if a disc is desired with one spare area and one user data area, and that disc has 1.5 million sectors and if a spare area of about 5% of the available sectors were desired, the user data area would need to be 1.425 million sectors. The closest allowed numbers are approximately 1 million and approximately 2 million (i.e., $2^{20}$ or $2^{21}$), thus preventing this layout. However, if the spare area is first, 65536 sectors could be allocated followed by 2 million user data sectors. According to the present invention, it doesn't matter that the last ½ million sectors do not exist. In fact, the user data area could be any number greater than 2 million. The figure is merely a parameter to the equation; if the output of the equation is a physical address larger than what actually exists on the media, the request fails at that point.

Figure 4:
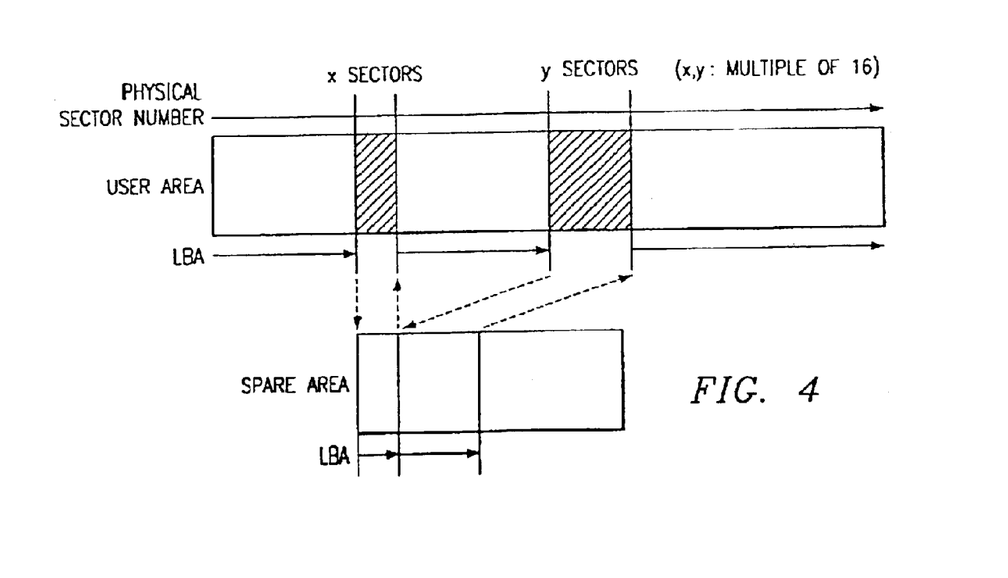
FIG. 4 illustrates replacing of defective user blocks with sparing blocks.

DVD+RW media is directly addressable by a logical block address, i.e., error correction code (ECC) blocks having 16 sectors each, and permits reading and writing from any of the consecutively numbered logical blocks. The actual data may not be stored in a consecutive manner, even though the logical blocks are consecutive, because of defect management and the existence of physical sectors which do not directly correspond to logical blocks. This is illustrated in FIG. 4 where defective sectors X and Y of the user area are replaced with sectors from a sparing area, such as may be established physically ahead of the area directly available to the user.

As in DVD-ROM, logical block address (LBA) 0 preferably does not map to physical block address (PBA) 0. Instead, the first data block is at PBA 31000h. Additionally, it is preferred that no sparing occur in drive data areas, but rather sparing occurs only within the user data area, which begins at physical sector number 31000h. DVD+RW preferably places the first defect management area at this first data block. Accordingly, if any sparing space is established at format, the first non-defective bock at or after block 31000h is reserved for sparing.

Preferably, LBA 0 is assigned to the first non-defective block following the first spare area. The logical block addresses increase monotonically from this point to the outer diameter of the media, skipping each defect listed in the active PDL as well as each of the areas set aside for sparing.

The sparing parameters, SI and SL, are contained in the defect management area (DMA) which, for example, may consist of 128 sectors reserved on the media for use as the defect management area. The DMA also contains information with respect to the primary defect list, i.e., slipping of physical addresses to logical addresses, and secondary defect list, i.e., replacement of defective blocks with sparing blocks. Accordingly, in the preferred embodiment, the DMA contains an active PDL, a backup or duplicate PDL, an active SDL, including a list of areas available for sparing, and a backup or duplicate SDL. With respect to the multiple copies of the PDL and SDL, the preferred embodiment reads all copies and uses the one with the highest sequence number. If there are multiple copies with the same highest sequence number, any copy may be used, with no stated preference.

Preferably, each defect management area includes 64 sectors, grouped into 4 ECC blocks. Although, where 2 K sectors are utilized, 32 K is set aside each for the PDL and SDL, preferably (N_PDL*4+N_SDL*8≦32,744) shall be true. Where N_SDL and N_PDL are parameters in the SDL and PDL, respectively. N_SDL being the number of entries in the SDL. N_PDL being the number of entries in the PDL.

The contents of each of the ECC blocks is shown in the table below.

| DMA ECC block layout | |
|---|---|
| Sector (block) | Contents |
| 0 (0) | PDL |
| 16 (1) | SDL |
| 32 (2) | PDL |
| 48 (3) | SDL |

Preferably, all copies of the PDL are equivalent and all copies of the SDL are equivalent, i.e., active and inactive copies of the PDL and SDL are provided for fault tolerance.

As discussed above, the PDL contains a list of blocks determined to be defective at format time. These blocks are "slipped" out of logical space by not assigning a logical address to slipped blocks. Preferably, the PDL consists of a header followed by a defect list, as shown in the table below.

| | PDL area format | |
|---|---|---|
| BP | Contents | Length |
| 0 | PDL Identifier = (02A50) | 2 |
| 2 | Number of PDL entries (N_PDL) | 2 |
| 4 | PDL Update Count | 4 |
| 8 | Spare Interval | 4 |
| 12 | Spare Length | 4 |
| 16 | PDL entry 0 | 4 |
| 20 | PDL entry 1 | 4 |
| ... | ... | ... |
| N_PDL × 4 + 12 | PDL entry N_PDL −1 | 4 |
| N_PDL × 4 + 16 | Reserved | . |
| To 32767 | set 60 (00) | ... |

Where BP, as used in the first column in the table above, represents byte position, which is the byte offset from the beginning of the structure, i.e., the beginning of the PDL.

In order to identify a PDL recorded according to the invention described herein, the PDL identifier will be a unique identification number or code, such as (02A50) illustrated above.

The number of PDL entries indicates the number of entries in the PDL. The PDL update count specifies the total number of update operations for the PDL area. This field should be set to zero (00000000) during the first format or certification operation, and thereafter incremented by one each time the PDL is rewritten.

The spare interval (SI) field and spare length (SL) field store the user definable logical zone information of the present invention discussed above. Accordingly, the spare interval field indicates the number of physical user data sectors between each set of blocks set aside for linear replacement operations. Likewise, the spare length (SL) field indicates the number of physical sectors set aside for linear replacement for each spare interval.

Preferably, each PDL entry is recorded as shown in the table below.

| PDL Entry | | | | | |
|---|---|---|---|---|---|
| $b_{31}$ | $b_{30}$ | $b_{29}$ | $b_{24}$ | $b_{23}$ | $b_0$ |
| Defect Type | | Reserved | | Defective Block Number | |

The defective block number preferably contains the physical sector number of the first sector of the ECC block to be skipped when assigning logical sector numbers. Entries are preferably sorted in ascending order by the defective block number field in order to facilitate rapid searching of the PDL.

A preferred embodiment of the defect type entries are set forth in the table below.

PDL Entry Defect Type definition, $b_{31}$ and $b_{30}$

| Defect Type | Definition |
|---|---|
| 00 | The entry was generated by the disc manufacturer. |
| 01 | The entry was generated by the user manufacturer. |
| 10 | The entry was generated by the user by means other than certification. |
| 11 | The entry was generated by the disc manufacturer but is to be ignored when slipping. |

In a preferred embodiment of the present invention, defect types 00–10 are sorted together by defective block number and defect type 11 is sorted separately by defective block number and placed after all 00–10 entries.

The SDL contains a list of blocks determined to be defective during the use of the media. This determination may be made during either read or write operations, depending on user settings. The SDL preferably consists of a header followed by a defect list, as shown in the table below.

SDL area format

| BP | Contents | Length |
|---|---|---|
| 0 | SDL Identifier = (2A53) | 2 |
| 2 | Number of SDL entries (N_SDL) | 2 |
| 4 | SDL Update Count | 4 |
| 8 | SDL entry 0 | 8 |
| 16 | SDL entry 1 | 8 |
| ... | ... | ... |
| N_SDL × 8 | SDL entry N_SDL – 1 | 8 |
| N_SDL × 8 + 8 to 32767 | Reserved set to (00) | ... |

All blocks set aside for sparing are preferably identified by an SDL entry, whether they are currently in use for sparing or not (with a status field of unused blocks set to a value to indicate availability for use in sparing). Additionally, in the preferred embodiment, there are no hierarchical replacements of blocks, i.e., no replacement block number may be listed in any defective block number field. Furthermore, no PBA is listed more than once across the PDL and SDL according to the preferred embodiment of the present invention.

In order to identify a SDL recorded according to the invention described herein, the SDL identifier will be a unique identification number or code, such as (02A53) illustrated above. The number of SDL entries indicates the number of entries in the SDL. The SDL update count specifies the total number of update operations for the SDL area. This field should be set to zero (00000000) during the first format or certification operation, and thereafter incremented by one each time the SDL is re-written.

Preferably, each SDL entry is formatted as shown in the table below.

SDL entry format

| $b_{63}$ $b_{62}$ | $b_{61}$ $b_{56}$ | $b_{55}$ $b_{32}$ | $b_{31}$ $b_{24}$ | $b_{23}$ $b_0$ |
|---|---|---|---|---|
| Status | Reserved | Defective Block Number | Reserved | Replacement Block Number |

The defective block number identifies the physical sector address of the first sector of the block to be replaced. Similarly, the replacement block number identifies the physical sector address of the first sector of the block to hold the replaced block.

Preferably, the Status field indicates the status of the entry as shown in the table below.

SDL Entry Status definition, $b_{63}$ and $b_{62}$

| Defect Type | Definition |
|---|---|
| 00 | The entry identifies a valid replacement. |
| 01 | The entry identifies a defective location on the medium that has not been recorded at its new address. Note: A block identified by a 01b, when reading is requested, reads the block from its old "defective" address, and when writing is requested, the block is written to the replacement address and the status changed to 00b. |
| 10 | The replacement block number field identifies an area usable for future replacement. The defective block number field is set to zero. |
| 11 | The replacement block number field identifies a spare location unusable for sparing, i.e., a defective sparing block. The defective block number field is set to zero. |

Accordingly, each of the blocks set aside for replacement but not in use or identified as defective will be identified by an SDL status entry 10.

Preferably, the SDL is sorted in ascending order according to its 64 bit entries; e.g. first sorted by status, in order to facilitate location of used or available sparing blocks for example, and then by defective block number, to facilitate locating a replacement block for a particular logical block address for example, then by replacement block number, to facilitate location of a nearest or next available replacement block for example.

Figure 5:
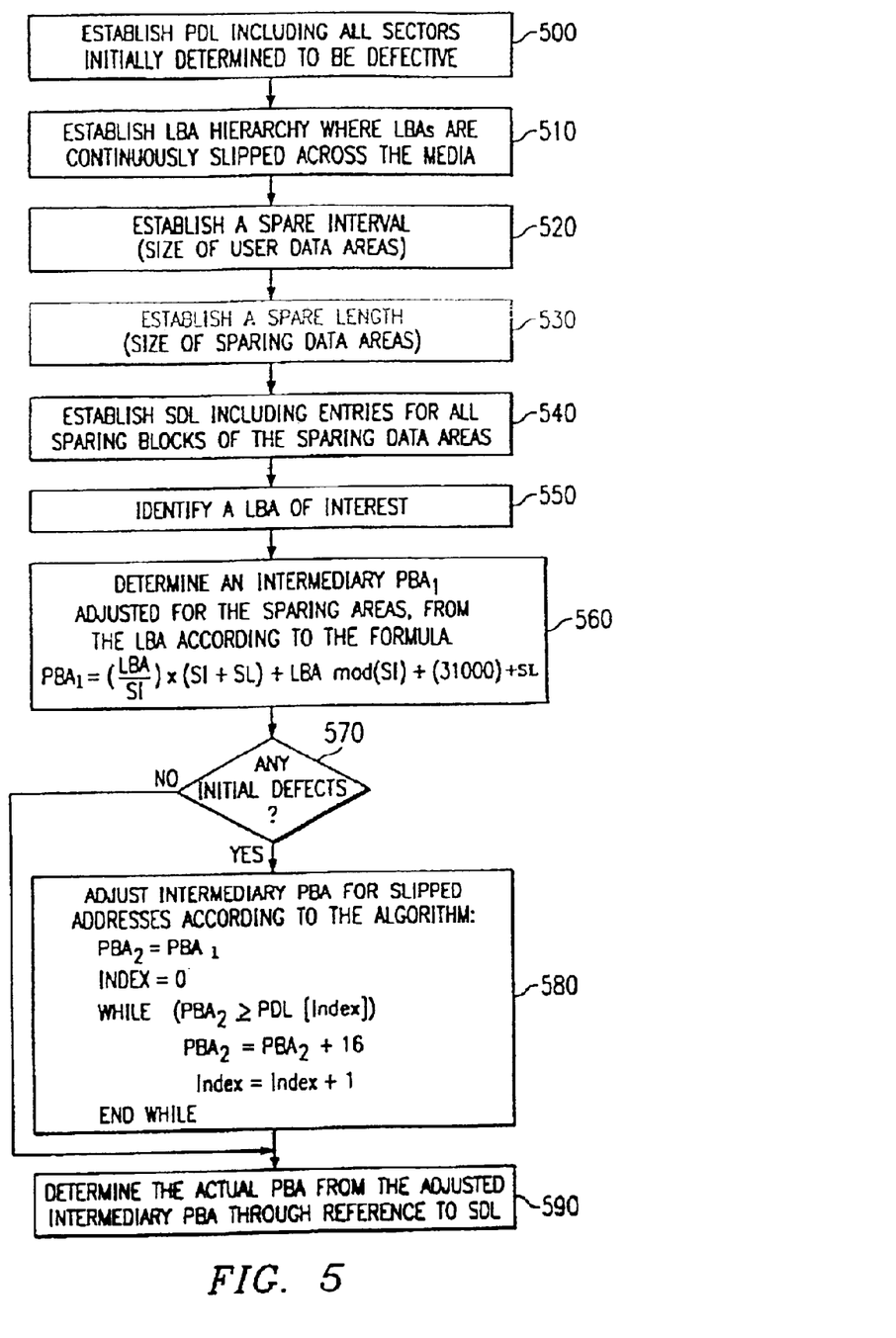
FIG. 5 illustrates a flow diagram of the sequence of determining a physical address from a logical address according to an embodiment of the present invention.

A sequence for determining the PBA for a supplied LBA according to the present invention is as illustrated in FIG. 5 and as described as follows:

Initially, according to the preferred embodiment of the present invention, a primary defect list is established, as described above, having information with respect to data areas initially determined to be defective (step 500). Utilizing this information, the logical block addresses for the data areas of the media are slipped to omit those defective areas (step 510). The spare interval and spare length parameters are utilized to establish on the media the particular areas to be used as user data areas and their corresponding sparing areas (steps 520 and 530). Additionally, the SDL is established, and subsequently maintained, to include each sparing block and its status (step 540). Having been adapted as above, a logical block address which is to be read or written may be selected (step 550) and the physical block address determined by the following steps.

Apply the formula $$PBA_1 = \left(\frac{LBA}{SI}\right) \times (SI + SL) + LBA \bmod(SI) + 31000h + SL$$

to the LBA to map around the areas set aside for defect management (step 560). This formula provides an intermediary physical block address taking into account the placement of the sparing areas as defined by the parameters SI and SL. Additionally, this formula also takes into account the fact that the preferred embodiment provides for user areas starting at 31000h. Of course, this formula is provided herein as an example and is not intended to limit the present invention. For example, where the user area begins at a point other than address 31000h, the formula would be adjusted accordingly. It shall be appreciated that all math according to the formula above is integer arithmetic.

Upon determining the intermediary physical block address ($PBA_1$), adjusting for the sparing areas established according to the present invention, this physical block address must then be adjusted for any slipping of addresses due to initial defects. Of course, where there are no initial defects, this second step is not necessary. Accordingly, a determination is made as to whether any initial defects exist (step 570). If not, the sequence proceeds to step 590. If there are initial defects, the sequence proceeds to step 580.

To adjust the intermediary physical block address in order to account for slipped addresses, the following algorithm is preferably utilized with reference to the PDL (step 580):

```
Set PBA₂ = PBA₁
Set Index = 0
While (PBA₂ ≥ PDL[Index])
    Set PBA₂ = PBA₂ + 16
    Set Index = Index + 1
End While
```

Accordingly, the primary defect list is searched to determine the number of physical block addresses entered therein which are disposed on the media prior to the intermediary physical block address. The intermediary physical block address is increased the slipping amount, in the preferred embodiment 16 sectors, for each such physical block address appearing in the PDL. Of course, this algorithm is provided herein as an example and is not intended to limit the present invention. For example, where the blocks utilized are other than 16 sectors, the algorithm would be adjusted accordingly.

Furthermore, although a linear search is shown wherein a "destination" block address is slipped one block per entry found in the PDL, it shall be appreciated that a binary search algorithm may be used. It shall be appreciated that a single search of the PDL is possible utilizing a binary search, as with the linear search above, if the Index*(block size) is added to the requested block before testing against the table. For example, blocks may be skipped by the index into the PDL where the entry is larger than the requested block and that index is added to the requested blocks.

Finally in determining the physical block address of a particular logical block address according to this preferred embodiment of the present invention, an attempt is made to find the intermediary physical block address adjusted for slipping ($PBA_2$) in the SDL (step 590). Because of the "blocking," no entries in the tables will have an address in the middle of a block. Since $PBA_2$, as determined above, may be any address, including the middle of a possibly relocated block, the address is adjusted to find the beginning of the block that would include $PBA_2$. Since the block size is in this preferred embodiment is 16, this start address can be found by performing a logical AND of $PBA_2$ with 1FFFF0h, essentially setting the four least significant bits to zero. The bits then need to be restored after the lookup in the SDL and, accordingly, $PBA_2$ is ANDed with 0Fh and added back to the replacement block address. The offset into the replacement block is the same as the offset into the original block. Accordingly, the PBA is preferably computed as shown below.

| SDL Interpretation | |
|---|---|
| Status | Translation |
| 00 | PBA = $PBA_{REPLACEMENT}$ + ($PBA_2$ & (0F)) |
| 01, reading | PBA = $PBA_2$ |
| 01, writing | PBA = $PBA_{REPLACEMENT}$ + ($PBA_2$ & (0F)) |
| 10 | PBA = $PBA_2$ |
| 11 | PBA = $PBA_2$ |

The sequence above indicates that the space set aside for sparing is slipped according to the PDL. However, entries in the SDL preferably indicate the actual physical address and therefore are not be adjusted by the PDL. This results in the replacement block numbers in the SDL possibly not having SI contiguous blocks every (SI+SL) interval.

Although the present invention and its advantages have been described in detail, it should be understood that various changes, substitutions and alterations can be made herein without departing from the spirit and scope of the invention as defined by the appended claims.

What is claimed is:

1. A method for providing media defect management that is controllable by a user, said method comprising:
   defining a user data area on the media that is useable by the user by choosing a value for a user area parameter;
   defining a user data replacement area on the media that is useable by the user by choosing a value for a replacement area parameter; and
   determining a particular distributed sparing configuration based on the values chosen by the user for the user area parameter and replacement area parameter, and thereby defining appropriate defect management.

2. The method of claim 1, further comprising:
   maintaining a defect list including information identifying each independently accessible section of user data replacement area on the media.

3. The method of claim 2, wherein the maintaining the defect list comprises:
   categorizing the independently accessible sections of the user data replacement area in the defect list to provide information with respect to their use in replacing sections of user data areas of the media.

4. The method of claim 3, wherein the information provided by the categorizing comprises information with respect to a defective section of the user data area that has not been recorded within a section of the user data replacement area.

5. The method of claim 3, wherein the information provided by the categorizing prevents chaining of a section of the user data area to multiple sections of the user data replacement area when a section of the user data replacement area becomes defective.

6. The method of claim 1, wherein the values selected for the user area parameter and the replacement area parameter combined define a logical zone such that, if the values selected for the user area parameter and the replacement area parameter are be sufficiently small with respect to a total size of the media, a plurality of equal in size zones of user data area and user data replacement area are defined on the media.

7. The method of claim 6, wherein a physical address of a particular section of the user data area adjusted for the existence of the logical zone from a logical address used to logically identify the particular section of the user data area may be determined through the result of the mathematical expression:

integer (logical address/value of user area parameter)× (value of user area parameter +value of replacement area parameter)+modulo (logical address/value of user area parameter)+(offset of user data area).

8. The method of claim 1, wherein choosing a value for the user area parameter and the replacement area parameter is selected from the group of relationships consisting of:

a sum of the values of the user area parameter and the replacement area parameter is approximately a size of the media;

a sum of twice the value of the user area parameter and the value of the replacement area parameter is approximately a size of the media;

a sum of the values of the user area parameter and the replacement area parameter is approximately ½ a size of the media;

a sum of the values of the user area parameter and the replacement area parameter is selected to be small with respect to a size of the media; and a sum of the values of the user area parameter and the replacement area parameter is approximately the size of an underlying physical zone.

9. The method of claim 1, wherein the user data replacement area associated with the value of the replacement area parameter is disposed on the media at an address prior to a corresponding user data area associated with the value of the user area parameter.

10. The method of claim 1, wherein the user data replacement area associated with the value of the replacement area parameter is disposed on the media at an address subsequent to a corresponding user data area associated with the value of the user area parameter.

11. The method of claim 9, wherein a sum of the values of the user area parameter and the replacement area parameter is selected to be greater than a size of the media to accommodate selection of a desired value of the replacement area parameter.

12. The method of claim 1, further comprising:

establishing a logical address hierarchy providing logical addressing for physical addresses of sections of the user data area and sections of the user data replacement area, wherein the logical address hierarchy omits physical addresses of sections of data areas determined to be defective, and wherein omission of physical addresses of sections of data areas determined to be defective affects logical addresses of all subsequent sections of data areas on the media.

13. The method of claim 12, wherein the establishing a logical address hierarchy comprises:

generating a defect list including information identifying the sections of the data areas determined to be defective and omitted from the logical address hierarchy.

14. The method of claim 12, wherein adjustment of the logical addressing for a particular physical address to omit physical addresses of sections of data areas determined to be defective is accomplished in units equivalent to a single user data area section.

15. The method of claim 1, wherein the selecting the values of the user area parameter and replacement area parameter is performed independent of data segment boundaries on the media arising from geometric characteristics of the media.

16. A system for providing media defect management, said system comprising:

a user data area on the media defined by a value selected for a user area parameter; and a user data replacement data area on the media defined by a value selected for a replacement area parameter, wherein the user data replacement area on the media defined by the value selected for the replacement area parameter may be null; and wherein the values selected for the user area parameter and replacement area parameter define a defect management format that is uniform for the media.

17. The system of claim 16, further comprising:

means for maintaining a defect list including information identifying each independently accessible section of user replacement data area on the media.

18. The system of claim 17, wherein the defect list maintaining means comprises:

means for categorizing the independently accessible sections of the user data replacement areas in the defect list to provide information with respect to their use in replacing user data areas of the media.

19. The system of claim 16, further comprising:

means for establishing a logical address hierarchy providing logical addressing for physical addresses of data areas on the media for use as the user data area associated with the value selected for the user area parameter and the user data replacement data area associated with the value selected for the replacement area parameter, wherein the logical address hierarchy omits physical addresses of data areas determined to be defective, and wherein omission of physical addresses of data areas determined to be defective affects logical addresses of all subsequent data areas on the media.

20. A method for providing media defect management for a block addressable bulk storage media, said method comprising:

establishing a number of blocks of a user data area on the media by choosing a value for a spare interval parameter, wherein the value is equal to $2^N$, where N is greater than or equal to 4;

establishing a number of blocks of a user data sparing area on the media by choosing a value for a spare length parameter, wherein the value is equal to $A(2^M)$ where M is greater than or equal to 4 and A is equal to 0 or 1;

wherein the chosen values for the spare interval parameter and spare length parameter determine a particular distributed sparing configuration irrespective of physical zones of the media; and maintaining a list including information identifying each block of the user data sparing area, wherein the list includes information with respect to a status of each block identified.

21. The method of claim 20, wherein the information with respect to a status of each block includes information with respect to a defective block of the user data area that has not been recorded within a block of the user data replacement area.

22. The method of claim 21, further comprising:

establishing a logical address hierarchy of the blocks of the media wherein physical addresses of blocks initially determined to be defective are not included in the logical address hierarchy, and wherein all logical addresses corresponding to a physical address subsequent to a block initially determined to be defective are adjusted at least an address space of the block initially determined to be defective.

23. The method of claim 20, wherein the selecting the values for the spare interval parameter and the spare length parameter defines appropriate defect management for a particular use of the media.

24. A system that provides user-controlled media defect management comprising:

a user data area on the media defined by selecting a value for a user area parameter; and a user data replacement data area on the media defined by selecting a value for a replacement area parameter, wherein the user data replacement area on the media defined by the value selected for the replacement area parameter may be null; and wherein the values selected for the user area parameter and replacement area parameter are selectable by a user to define a defect management format that is uniform for the media.

25. The system of claim 24, further comprising:

a defect list that identifies each independently accessible section of user replacement data area on the media.

26. The system of claim 25, wherein the defect list categorizes the independently accessible sections of the user data replacement areas in the defect list to provide information with respect to their use in replacing user data areas of the media.

27. The system of claim 26, wherein the defect list provides information with respect to a defective section of the user data area that has not been recorded within a section of the user data replacement area.

28. The system of claim 27, wherein the values selected for the user area parameter and the replacement area parameter combined define a logical zone such that, if the values selected for the user area parameter and the replacement area parameter are sufficiently small with respect to a total size of the media, a plurality of equal in size zones of user data area and user data replacement area are defined on the media.

29. The system of claim 24, wherein the values of the user area parameter and the replacement area parameter are selectable from the group of relationships consisting of:

a sum of the values of the user area parameter and the replacement area parameter is approximately a size of the media;

a sum of twice the value of the user area parameter and the value of the replacement area parameter is approximately a size of the media;

a sum of the values of the user area parameter and the replacement area parameter is approximately ½ a size of the media;

a sum of the values of the user area parameter and the replacement area parameter is selected to be small with respect to a size of the media; and a sum of the values of the user area parameter and the replacement area parameter is approximately the size of an underlying physical zone.

30. The system of claim 24, wherein the user data replacement area associated with the value of the replacement area parameter is disposed on the media prior to the user data area associated with the value of the user area parameter.

31. The system of claim 24, wherein the user data replacement area associated with the value of the replacement area parameter is disposed on the media subsequent to the user data area associated with the value of the user area parameter.

32. The system of claim 30, wherein a sum of the values of the user area parameter and the replacement area parameter is selected to be greater than a size of the media to accommodate selection of a desired value of the replacement area parameter.

33. The system of claim 24, wherein the user data replacement data area is determined irrespective of a geometric arrangement of data storage elements due to a physical structure of the media.

* * * * *